United States Patent [19]

Hefley et al.

[11] 4,439,767

[45] Mar. 27, 1984

[54] LIGHTWEIGHT OPTICAL JAMMER SYSTEM

[75] Inventors: Richard M. Hefley; Douglas R. Tomren; Jerold L. Jacoby, all of Long Beach, Calif.

[73] Assignee: The United States of America as represented by the Secretary of the Air Force, Washington, D.C.

[21] Appl. No.: 237,357

[22] Filed: Jan. 28, 1981

[51] Int. Cl.³ .................. F41H 5/00; G03B 21/00; G01S 7/36

[52] U.S. Cl. .................. 343/18 E; 89/36 R; 353/3; 455/600; 455/605; 126/425

[58] Field of Search .................. 250/203 R; 455/600, 455/605, 614; 353/3; 126/425; 89/1 A, 36 R; 343/18 E

[56] References Cited

U.S. PATENT DOCUMENTS

| | | | |
|---|---|---|---|
| 235,199 | 12/1880 | Bell | 455/614 |
| 2,022,144 | 11/1935 | Nicolson | 353/3 |
| 2,602,886 | 7/1952 | Fields | 250/7 |
| 3,768,754 | 10/1973 | Janes | 244/1 |
| 3,808,428 | 4/1974 | Barry et al. | 372/79 |
| 4,116,598 | 9/1979 | Seifert et al. | 244/160 |
| 4,117,484 | 9/1978 | Shizume | 343/18 E |
| 4,139,286 | 2/1979 | Hein et al. | 353/3 |
| 4,222,632 | 9/1980 | Eichweber | 350/102 |

*Primary Examiner*—S. C. Buczinski

*Attorney, Agent, or Firm*—Donald J. Singer; Jacob N. Erlich

[57] ABSTRACT

A lightweight (i.e., less than 50 kg) optical jammer system for use with a satellite in earth orbit. The jammer system is mounted on the satellite and produces an obfuscating programmable signature of concentrated sunlight which is modulated and directed to earth. A potential enemy observer on earth is thereby prevented from ascertaining the general mission of the satellite, because the known reflected sunlight signature of the satellite is masked.

1 Claim, 4 Drawing Figures

| | | | | | | | | |
|---|---|---|---|---|---|---|---|---|
| MINIMUM INCIDENT POWER REQUIRED (kW) | 11.4 | 7.4* | 5.40 | 4.86 | 2.43 | 2.19 | 1.97 | 1.77 |
| POWER (MAX) ABSORBED (W) | 1140 | 740 | 540 | 486 | 243 | 219 | 197 | — |
| EQUILIBRIUM TEMP. (EST) K | 200 | 288 | 573 | 478 | 469 | 446 | 27 | — |
| MINUMUM AREA ($m^2$) | 8.25* | 2.00* | .100 | .186 | .100 | .110 | .788 | — |
| SOLAR CONCENTRATION (SUNS) | 1 | 3 | 54 | 78 | 24 | 20 | 2.5 | — |
| NOMINAL THROUGHPUT LOSS (%) | 35* | 27* | 10 | 50 | 10 | 10 | 10 | |

* INCLUDES CONSERVATIVE SAFETY MARGIN (~20%)

LIGHTWEIGHT OPTICAL JAMMER SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to the communications and aeronautics arts and, more particularly, to a lightweight optical jammer system which is adaptable for use with an airborne vehicle, and more specifically, with a vehicle in space, such as a satellite in earth orbit.

Over a period of the last few years, the United States Government has placed an ever growing number of defense related satellites into earth orbit. Because of the maturing capability of a potential enemy to identify and determine the general mission of synchronous U.S. satellites from reflected sunlight signatures, what is needed and is not presently available is a survival aid to be mounted on a satellite to prevent the ascertainment of the mission classification (i.e., surveillance, communication, navigation, weather, reconnaissance, and the like) of the satellite.

SUMMARY OF THE INVENTION

This invention provides apparatus for, and a method of, creating artificial glints from a host satellite, thereby preventing a potential enemy from ascertaining the general mission of the satellite from its known reflected sunlight signature, and also thereby fulfilling the above-mentioned need. Therefore, this invention constitutes a significant advance in the state-of-the-art.

Accordingly, the principal object of this invention is to provide a lightweight (e.g., less than 50 kilograms) apparatus (i.e., a system) for creating artificial glints (i.e., bright flashes of light).

Another object of this invention is to permit the use of the aforementioned system in combination with an earth satellite or the like.

Still another object of this invention is to provide a programmable optical signature which masks the known signature of the host satellite and thereby deceives a potential enemy observer.

Yet another object of this invention is to permit the masking programmable optical signature to be varied on command from the ground or to be pre-set before launch.

Still yet another object of this invention is to permit the optical signature of the host satellite to be buried in an obfuscating optical signal which is generated on the host satellite.

Another object of this invention is to provide a jammer signal which does not modify the color or polarization content of the satellite signature.

Still another object of this invention is to teach the fundamental and unique steps of our inventive method of creating artificial glints.

These objects of this invention, as well as other related objects thereof, will become readily apparent after a consideration of the discription of the invention, together with reference to the contents of the Figures of the drawing.

Figure 1:
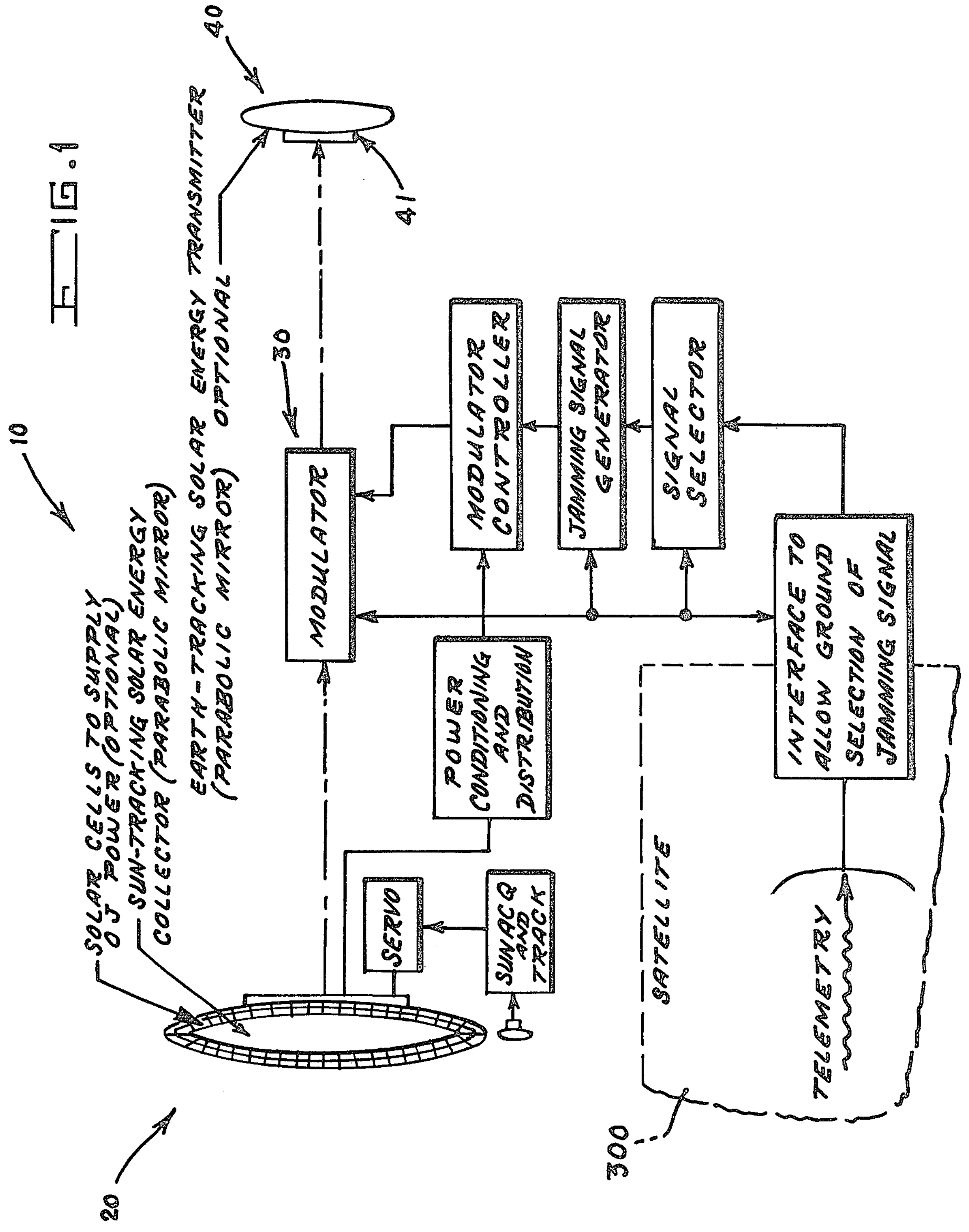
FIG. 1 is a block diagram of a preferred embodiment of the invention in combination with a satellite in orbit.

It is to be noted that the contents of the Figures of the drawing also show, in their totality (i.e., cumulatatively). the result of practicing the steps of our inventive method which will be described in detail later herein.

DESCRIPTION OF THE PREFERRED EMBODIMENT

With reference to FIGS. 1–4, inclusive, there is shown the preferred embodiment 10 (or constituent components thereof) of this invention.

Figure 2:
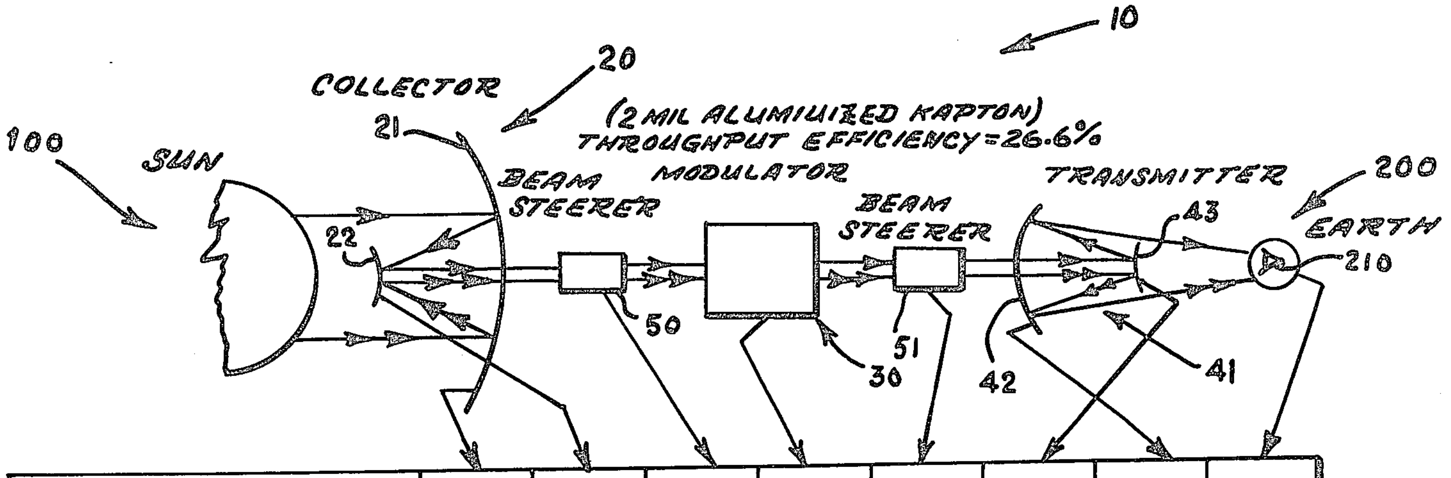
FIG. 2 is a side elevation view, in simplified schematic form of the preferred embodiment of the invention in its positional relationship with the earth and the sun, and a chart showing the thermal considerations involved.
Figure 3:
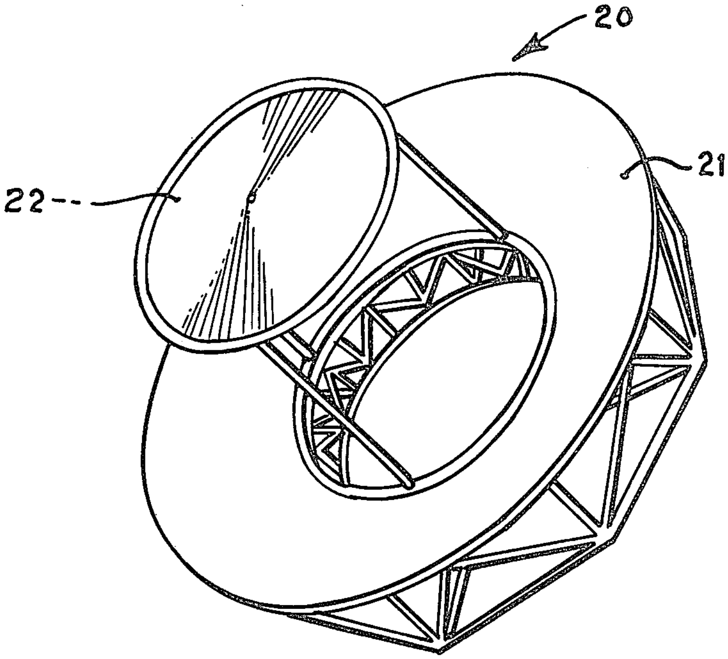
FIG. 3 is a perspective view, in simplified pictorial and schematic form, of the solar energy concentrator subsystem component of the invention.
Figure 4:
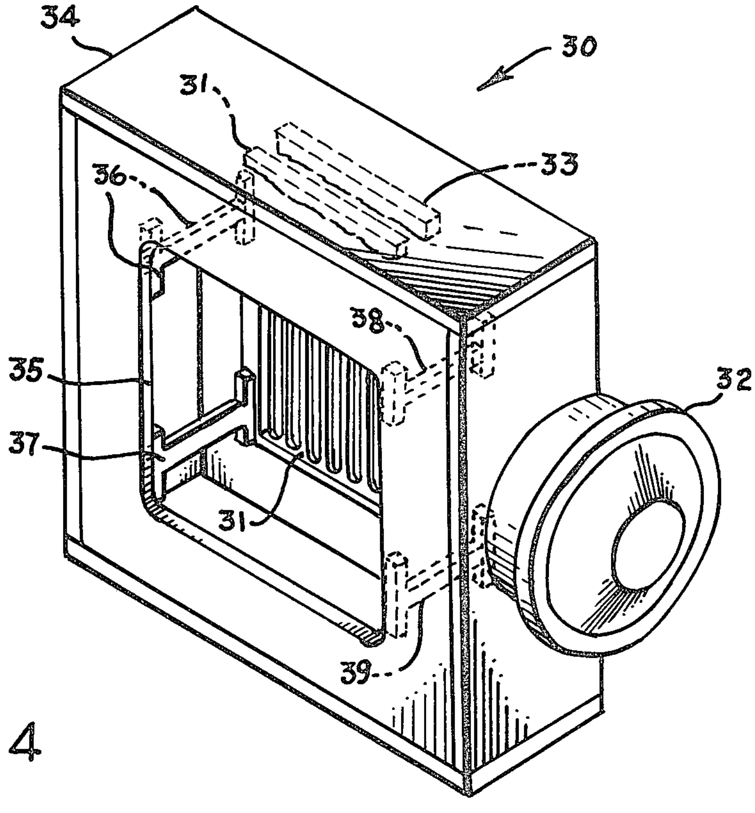
FIG. 4 is a perspective view, in simplified pictorial and schematic form, of the modular subsystem component of the invention.

In the most basic and generic form, the invention 10 is a lightweight (i.e., less than 50 kilograms) optical jammer system which comprises: a solar energy concentration subsystem 20, FIG. 1–3, inclusive, a modulator subsystem 30, FIGS. 1, 2 and 4, that is operatively associated (such as by optical alignment) with the solar energy concentrator system 20; and, an optical transmitter subsystem 40, FIGS. 1 and 2, that is operatively assembled (such as by optical alignment) with the modulator subsystem 30.

More specifically, the solar energy concentrator subsystem 20 includes means for tracking the sun 100, FIG. 2, collecting energy therefrom, and concentrating the collected solar energy. The modulator subsystem 30 includes means for imposing on the concentrated collected solar energy varying modulation in amplitude and frequency. The optical transmitter subsystem 40 includes means for tracking the earth 200, FIG. 2, and directing the modulated solar energy to the earth 200.

It is here to be noted that the inventive system 10 is intended for use in combination with a satellite (or a space vehicle, or a spacecraft), such as 300, FIG. 1, which is in earth orbit (e.g., synchronous with the earth 200, FIG. 12).

The means for tracking the sun 100, collecting energy therefrom and concentrating the collected solar energy (of the solar energy concentrator subsystem 20, FIGS. 1–2, inclusive) includes: a truncated cone primary mirror 21, FIGS. 2 and 3; and a compound elliptical secondary mirror 22, FIGS. 2 and 3, in optical alignment with the primary mirror 21, and with the mirrors 21 and 22 being disposed in a configuration analogous to a Gregorian telescope.

The means for imposing on the concentrated collected solar energy a varying modulation in amplitude and frequency (of the modulator subsystem 30, FIGS. 1, 2, and 4) includes: a first metal grid 31, FIG. 4, connected to a driving means 32, FIG. 4, whereby the first grid 31 can be selectively moved; a second metal grid 33 disposed in parallel spaced relationship with the first metal grid 31 and simultaneously positioned opposite to the first metal grid 31; a brazed stainless steel honeycomb housing 34, FIG. 4, for containing the first and second metal grids 31 and 33, and with the housing 34 having an opening 35 opposite the first metal grid 31; and a plurality of spring flexures 36–39, FIG. 4, interconnecting the first metal grid 31 and the housing 34. As the driver 32 translates the movable first grid 31, light is alternately transmitted and blocked. By alternating the fraction of the open area in each grid 31 and 33, the modulation can be varied.

It is here to be noted that conventional beam steerers (such as 50 and 51, FIG. 2) may, but need not, be used to steer the collected solar energy (i.e., radiation) into and out of the modular subsystem 30, FIG. 2. These beam steerers 50 and 51 preferably are used, and also preferably are flat front surface mirrors which are made of lightweight brazed stainless steel honeycomb material and which have a back surface that is perforated and/or coated with a high emissivity coating to enhance thermal rejection.

The means for tracking the earth 200 and directing the modulated solar energy thereto (of the optical transmitter subsystem 40, FIGS. 1 and 2 includes a transmitter telescope 41, FIGS. 1 and 2, made of lightweight honeycomb material with highly reflective optical surfaces 42 and 43, FIG. 2, in a configuration analagous to a Gregorian transmitter telescope (i.e., a two-reflector system).

DESCRIPTION OF THE INVENTIVE METHOD

As a preliminary manner, it is to be remembered that our inventive method is for use with a satellite (or a space vehicle), such as 300, FIG. 1, which is in earth orbit; and, it is also to be remembered that the contents of FIGS. 1–4, inclusive, of the drawing shown in their totality (i.e., cumulatively) the result of practicing the steps of our inventive method.

Our preferred method of creating artificial glints (i.e., tiny bright flashes of light) from a satellite in earth orbit comprises, essentially, the below-listed steps.

Firstly, tracking the sun 100, FIG. 2, from the satellite 300, FIG. 1.

Next, collecting solar energy from the sun 100, FIG. 2.

Then, concentrating the collected solar energy, as best shown in FIG. 2.

Next, imposing, on the concentrated solar energy, a modulation which varies in amplitude and frequency.

Then, tracking the earth 200, FIG. 2, from the space vehicle 300, FIG. 1.

Lastly, directing the modulated solar energy to the earth 200, FIG. 2.

As a result of practicing the steps of our method, the sunlight which is reflected from the satellite (as shown in FIG. 2), and which is seen by an observer on earth (such as 210, FIG. 2), is altered and disguised, and the observer is thereby deceived.

MANNER OF USE OF THE PREFERRED EMBODIMENT

The manner of use, and of operation (i.e., function), of the preferred embodiment of the inventive lightweight optical jammer system 10, FIGS. 1–4, inclusive, can be easily ascertained by any person of ordinary skill in the art from the foregoing description, coupled with reference to the contents of the Figures of the drawing.

For others, it is sufficient to say that the manner of use and of operation of the inventive system 10 can best be understood by reading the description of the method of creating artificial glints with the inventive system 10, FIGS. 1 and 2, from the satellite 300, FIG. 1, with which the system 10 is combined. Succinctly, what occurs is that energy (i.e., radiation) from the sun 100, FIG. 1, is collected, concentrated, and transmitted by the solar energy concentrator subsystem 20 to the modulator subsystem 30 where a modulation varying in amplitude and frequency is imposed upon the received radiation. This modulated radiation is then transmitted by the modulator subsystem 30 to the optical transmitter subsystem 40 from which it is transmitted to earth 200.

The uniqueness of the system 10 can best be appreciated by accepting the fact that the use of the system 10 with the host satellite 300, which is in earth orbit, prevents a potential enemy of the United States from ascertaining the general mission of the satellite from the known reflected sunlight signature of the satellite, because the artificial glints created by the system 10 mask the known reflected sunlight signature of the satellite.

CONCLUSION

It is abundantly clear from all of the foregoing, and from the contents of the Figures of the drawing, that the stated objects of the invention, as well as related objects thereof, have been achieved.

It is to be noted that, although there have been described and shown the fundamental and unique features of the inventive system 10, as applied to a preferred embodiment adapted for use in a particular application (i.e., to mask the known sunlight signature of a satellite in earth orbit), various other embodiments, variations, adaptations, substitutions, additions, omissions, and the like may occur to, and can be made by, those of ordinary skill in the art for use in this and other applications. For example, the jammer system 10 can also be used with a decoy, as part of a reactive countermeasure system.

Additionally, because of our teachings herein, it may occur to others of ordinary skill in the art that, in appropriate particular circumstances, the number of the basic and fundamental steps of our inventive method can be increased, decreased, or otherwise varied, and/or that their sequence can be changed. In this regard it is to be noted that, in spite of any variations in the number or sequence of the steps of our method, the same desired results will be obtained, nevertheless.

What is claimed is:

1. A method of creating artificial glints from a satellite in earth orbit, comprising the steps of:

a. tracking the sun from said satellite;
b. collecting solar energy from said sun;
c. concentrating said collected solar energy;
d. imposing, on said concentrated solar energy, a modulation varying in amplitude and frequency;
e. tracking the earth from said satellite; and
f. directing the modulated solar energy to the earth;

whereby sunlight reflected from said satellite, and seen by an observer on earth, is altered and disguised, thereby deceiving said observer.

* * * * *